US006997676B2

(12) United States Patent
Koshoffer

(10) Patent No.: US 6,997,676 B2
(45) Date of Patent: Feb. 14, 2006

(54) BIFURCATED OUTLET GUIDE VANES

(75) Inventor: John Michael Koshoffer, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 51 days.

(21) Appl. No.: 10/797,703

(22) Filed: Mar. 10, 2004

(65) Prior Publication Data
US 2005/0201856 A1  Sep. 15, 2005

(51) Int. Cl.
*F03B 3/18* (2006.01)

(52) U.S. Cl. .................. 415/115; 415/211.2; 416/97 R
(58) Field of Classification Search ............. 416/90 R, 416/91, 96 R, 97 R; 415/115, 211.2
See application file for complete search history.

(56) References Cited

U.S. PATENT DOCUMENTS

| 2,759,663 | A | * | 8/1956 | Stalker ................. 416/90 R |
| 2,859,910 | A | * | 11/1958 | Stalker ................. 415/115 |
| 4,624,104 | A | | 11/1986 | Stroem |
| 4,817,378 | A | * | 4/1989 | Giffin et al. ............... 60/762 |
| 4,989,406 | A | | 2/1991 | Vdoviak et al. |
| 5,480,284 | A | * | 1/1996 | Wadia et al. ............ 416/91 |
| 6,200,092 | B1 | | 3/2001 | Koschier |
| 6,270,037 | B1 | | 8/2001 | Freese et al. |
| 2003/0059291 | A1 | | 3/2003 | Koshoffer et al. |

* cited by examiner

Primary Examiner—Edward K. Look
(74) Attorney, Agent, or Firm—William S. Andes; Francis L. Conte

(57) ABSTRACT

A turbine rear frame includes a row of outlet guide vanes extending between outer and inner bands. Each of the vanes is bifurcated into a forward prow integrally joined to an aft stern by a septum therebetween. The prow and stern collectively define the aerodynamic profile of each vane which is locally interrupted at the septum.

32 Claims, 4 Drawing Sheets

BIFURCATED OUTLET GUIDE VANES

The U.S. Government may have certain rights in this invention pursuant to contract number N00019-96-C-0176 awarded by the U.S. Department of the Navy.

BACKGROUND OF THE INVENTION

The present invention relates generally to gas turbine engines, and, more specifically, to outlet guide vanes therein.

In a gas turbine engine, air is pressurized in a compressor and mixed with fuel for generating hot combustion gases from which energy is extracted in turbine stages. A high pressure turbine (HPT) immediately follows the combustor and extracts energy for powering the compressor. A low pressure turbine (LPT) follows the HPT and extracts additional energy from the combustion gases for powering an upstream fan in an exemplary aircraft turbofan engine application.

Each turbine stage includes a row of nozzle vanes specifically configured for precisely directing the combustion gases into a cooperating row of turbine rotor blades disposed downstream therefrom. The vanes and blades have specifically configured aerodynamic profiles for maximizing energy extraction from the combustion gases, with the profiles thereof being opposite to each other and alternating from stage to stage.

From the last turbine stage in the LPT, the combustion gases are exhausted through outlet guide vanes (OGVs) typically found in the turbine rear frame immediately downstream of the LPT.

The OGVs typically have specific aerodynamic profiles to remove swirl, or deswirl the exhaust flow prior to discharge from the engine for enhancing the performance thereof. Exhaust swirl is defined as the angle of discharge from the last stage turbine blades relative to the axial centerline axis of the engine. The swirl angle will vary during low to high power operation of the engine.

The range or swing in swirl angle varies from minimum to maximum values depending upon the configuration and operation of the specific engine and may be relatively small or relatively large. For small values of swirl range, the individual OGVs may have suitable aerodynamic profiles with generally convex suction sides and generally concave pressure sides, with a corresponding pitch or angular orientation around the radial axis for deswirling the exhaust flow. Deswirling operation of the OGVs remains effective as long as the exhaust flow remains attached to the surfaces of the vanes.

In applications containing large swirl range, the specific aerodynamic profile and angular orientation of the OGVs may be insufficient to prevent flow separation from the vanes at one or both extremes in the range of swirl angles. Since a vane is typically optimized for a specific design point, off-design point operation of the vane changes the aerodynamic performance thereof eventually leading to flow separation at excess swirl angles of the exhaust.

Flow separation of the exhaust flow from the OGVs is undesirable since it destroys the ability of the vanes to properly deswirl the exhaust flow, and therefore reduces aerodynamic performance and efficiency of the engine.

The ability to deswirl exhaust flow is made more difficult in variable cycle gas turbine engines such as those specifically configured for short takeoff and vertical landing (STOVL) operations. STOVL aircraft are typically used by the military for the extreme military requirements thereof. One type of STOVL aircraft includes an augmented turbofan engine having an afterburner at the aft end thereof, with a variable area exhaust nozzle. The afterburner permits additional fuel to be burned therein for substantially increasing the available thrust and power generated by the engine when required.

Since the afterburner is disposed downstream from the turbine OGVs, performance of those vanes is further important to ensure suitably deswirled exhaust flow to the afterburner for the proper performance thereof during reheat or wet operation.

Performance of the turbine OGVs is further complicated by the modification of the turbofan engine for the STOVL operation which may include an extension of the fan drive shaft for powering an auxiliary fan mounted in the aircraft wing for enhancing vertical lift. And, bleed tubes may join the turbofan bypass duct for bleeding therefrom when desired a portion of the fan air which is diverted to corresponding nozzles in the aircraft for providing additional vertical lift capability and stability control of the aircraft in the STOVL mode of operation.

Accordingly, this exemplary form of STOVL turbofan engine creates a large swing or range in the swirl angle of the exhaust discharged from the core engine through the OGVs. In conventional takeoff and landing operation of the engine, the swirl angle of the exhaust flow is limited in value and range. Whereas, during the STOVL mode of operation of the engine, the swirl angle of the exhaust flow from the core engine is substantially changed to large values.

The typical fixed-design deswirling outlet guide vane is thusly severely limited in its ability to handle the large range of swirl angle change found in a STOVL aircraft engine.

It is therefore desired to provide outlet guide vanes specifically configured for accommodating large swing in swirl without undesirable flow separation therein.

BRIEF DESCRIPTION OF THE INVENTION

A turbine rear frame includes a row of outlet guide vanes extending between outer and inner bands. Each of the vanes is bifurcated into a forward prow integrally joined to an aft stern by a septum therebetween. The prow and stern collectively define the aerodynamic profile of each vane which is locally interrupted at the septum.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
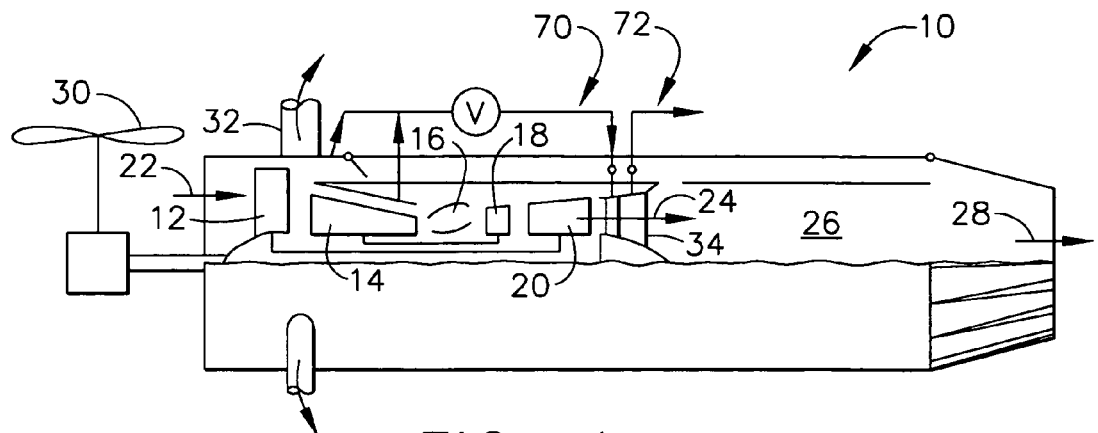
FIG. 1 is an axial schematic view of an exemplary STOVL turbofan aircraft engine including a row of outlet guide vanes at the discharge end of the core engine thereof.

Illustrated schematically in FIG. 1 is a turbofan gas turbine engine 10 specifically configured for powering a STOVL aircraft in an exemplary application. The engine is axisymmetrical about a longitudinal or axial centerline axis and includes in serial flow communication a fan 12, multistage axial compressor 14, combustor 16, high pressure turbine (HPT) 18, and low pressure turbine (LPT) 20. The HPT 18 is joined to the compressor 14 by one shaft, and the LPT 20 is joined to the fan 12 by another shaft.

During operation, air 22 enters the engine and is pressurized in the compressor 14 and mixed with fuel in the combustor 16. The aspirated air is ignited for generating hot combustion gases 24 which are discharged in turn through the HPT 18 and LPT 20 that extract energy therefrom. The HPT powers the compressor, and the LPT powers the fan.

In the exemplary STOVL configuration illustrated in FIG. 1, the engine also includes an augmentor or afterburner 26 in which additional fuel may be burned when desired for increasing the exhaust thrust from the engine. A variable area nozzle 28 is located at the aft end of the afterburner and cooperates therewith for maximizing performance of the engine over its intended flight envelope.

For the STOVL application, the engine 10 illustrated in FIG. 1 further includes an auxiliary fan 30 operatively joined to the main fan 12 by a drive shaft extension thereof. And, large bleed tubes 32 are joined in flow communication to the upstream end of the bypass duct surrounding the core engine for bleeding a portion of the fan air therefrom when desired.

The STOVL engine 10 illustrated schematically in FIG. 1 may have any conventional configuration and operation for operating in a conventional mode without the use of the auxiliary fan 32 and bleed tubes 32, and in a STOVL mode of operation in which the auxiliary fan 30 is powered by the engine, and fan air is bled from the engine through the tubes 32 to suitable nozzles in the aircraft for providing additional lift and stability control thereof during operation. However, the STOVL capability of the engine 10 illustrated in FIG. 1 results in a substantial range or swing in swirl angles of the exhaust flow 24 discharged from the LPT 20 during operation into the augmentor 26.

Accordingly, the engine includes a turbine rear frame 34 specifically configured for accommodating the extended range in swirl angle for this type of engine without the need for mechanical articulation thereof which would otherwise increase complexity and weight of the engine. The rear frame 34 is illustrated isometrically in part in FIG. 2 and in planiform view in part in FIG. 3 in accordance with an exemplary embodiment.

The rear frame is an annular assembly of components and is axisymmetrical about the longitudinal or axial centerline axis of the engine. The frame includes a plurality of outlet guide vanes (OGVs) 36 arranged in a circumferential row extending radially between outer and inner supporting bands 38,40.

Figure 3:
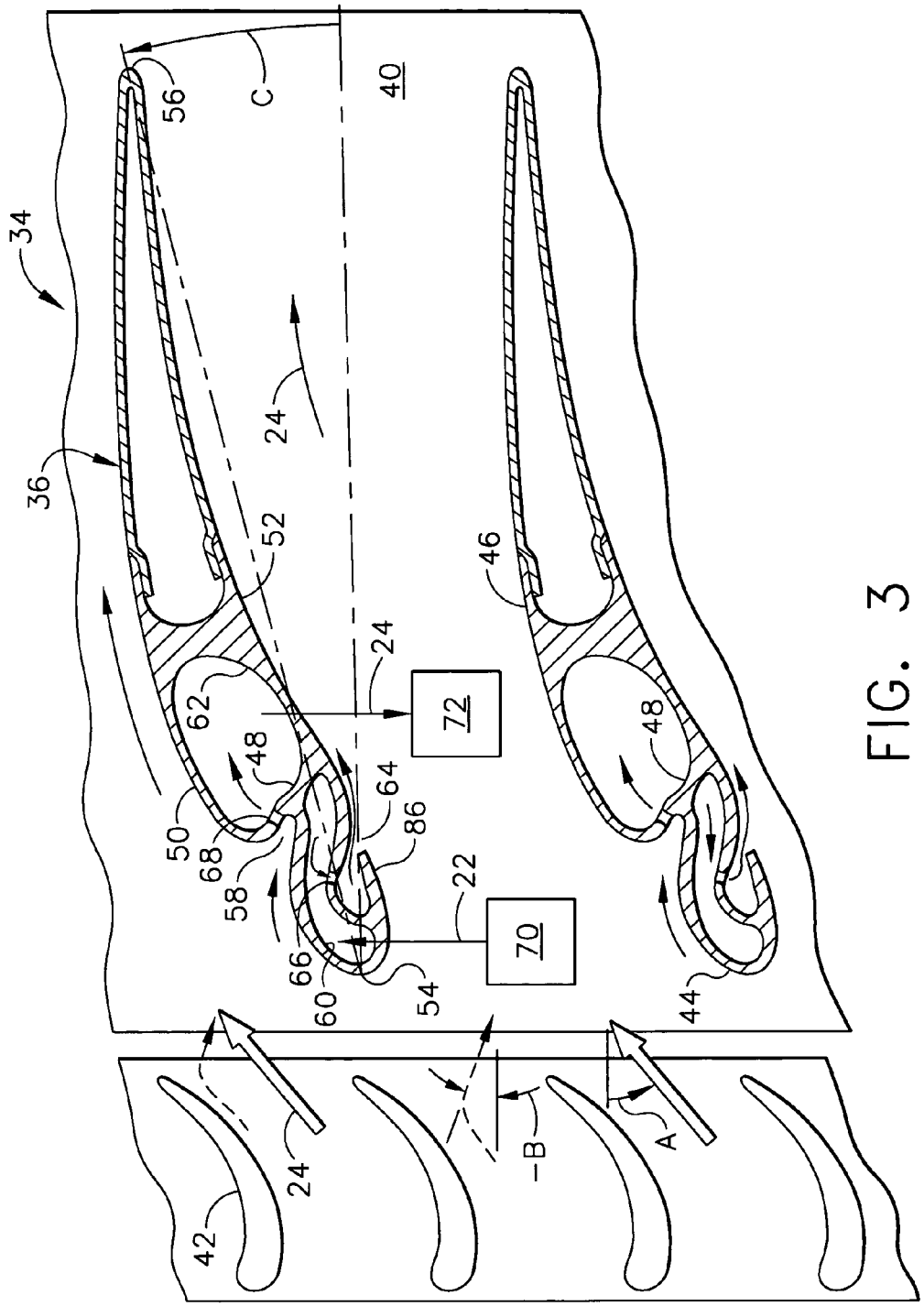
FIG. 3 is a planiform sectional view through some of the OGVs illustrated in FIGS. 1 and 2 located immediately downstream of the last stage turbine blades.

As shown in FIG. 3, the vanes 36 are disposed immediately downstream of the last stage row of turbine rotor blades 42 found in the LPT, and which extend radially outwardly from their supporting rotor disk. During operation, the exhaust flow 24 is discharged from the turbine blades 42 with a suitable swirl angle A which is measured relative to the axial centerline axis of the engine, toward the OGVs.

The swirl angle of the exhaust flow varies from a maximum positive value represented by the angle A to a corresponding minimum value represented by the negative swirl angle −B. For example, the maximum swirl angle may be about +40 degrees, and the minimum swirl angle may be about −20 degrees, with a combined range or swing of swirl being the 60 degree combination thereof.

The large range in swirl angle is specifically due to the variable cycle configuration of the STOVL engine 10 illustrated in FIG. 1. During normal operation of that engine, the turbofan engine operates in the normal manner of a turbofan engine with the core exhaust flow and the bypass air being discharged through the augmentor to the common outlet nozzle. And, during STOVL operation of the engine, the fan bypass flow around the core engine is temporarily interrupted by a suitable valve to divert fan air through the bleed tubes 32, while the auxiliary fan 30 is engaged for diverting corresponding power from the engine.

In this STOVL operation of the engine, the swirl angle of the exhaust flow 24 is drastically altered from its normal range as the exhaust flow is nevertheless discharged between the OGVs 36 into the augmentor.

In order to accommodate the large range in swirl angle of about 60 degrees, and even larger, the OGVs 36 illustrated in FIG. 3 are bifurcated in a specific manner for accommodating the large change in direction of the incident exhaust flow.

More specifically, each of vanes 36 illustrated in FIG. 3 is bifurcated into a forward prow or nose segment 44 and an aft stern or tail segment 46 by a narrow septum 48 extending chordally or axially therebetween. The prow and stern are an integral, and preferably unitary assembly and collectively define the aerodynamic profile or perimeter of each vane 36 with a convex suction side 50 and a circumferentially opposite, concave pressure side 52. The two sides 50,52 extend chordally between a leading edge 54 at the front of the prow 44 and an axially opposite trailing edge 56 at the aft end of the stern 46.

As shown in FIG. 3, the combined configuration of the prow and stern includes a chord extending between the leading and trailing edges thereof which may be located at a suitable pitch angle C relative to the axial centerline axis of the engine. The aerodynamic contour of the vanes 36 is generally opposite to the contours of the last stage turbine blades 42, and have a suitable pitch angle C for maximizing the deswirling capability of the vanes corresponding with the maximum expected swirl angle from the blades in the preferred embodiment.

Since the prow and stern illustrated in FIG. 3 are separated from each other by the joining septum or ligament 48, these two portions of each vane may be separately tailored in profile while still collectively providing the overall aerodynamic profile of the vane. The overall profile of the vane is locally interrupted chordally between the prow and stern at the septum therebetween. The septum 48 is relatively narrow across the width of the vane between its opposite sides, and introduces a first radial slot 58 which separates in part the prow from the stern. The septum 48 itself is preferably imperforate.

The stern 46 illustrated in FIG. 3 defines the major portion of each vane having the greatest amount of chordal length, whereas the prow 44 is relatively short in chordal length for the remaining minor portion of each vane. The prow 44 defines the leading edge portion of each vane, and the stern 46 converges aft to the trailing edge 56 from its junction with the forward prow at the septum 48. In this way, the prow shields the forward end of the stern and cooperates therewith as further described hereinbelow for substantially increasing the range of permissible swirl angle without undesirable flow separation of the exhaust flow over the vanes during operation.

Figure 2:
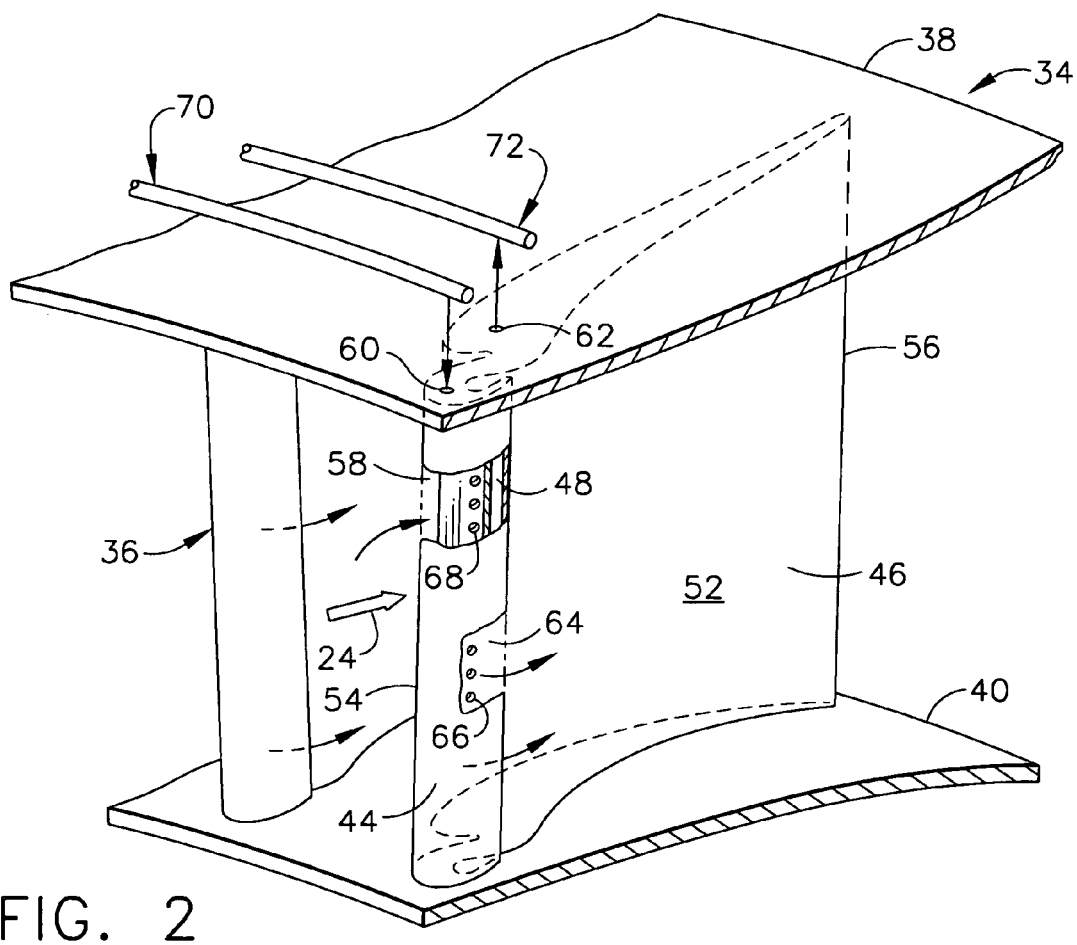
FIG. 2 is a partly sectional, isometric view of a portion of the OGVs illustrated in FIG. 1 in accordance with an exemplary embodiment.

The vanes illustrated in FIG. 3 are hollow at least in part and include in this exemplary embodiment an internal prow channel 60 extending radially through the prow, and a corresponding internal stern channel 62 extending radially through the stern. The two internal channels 60,62 in each vane preferably extend through the outer band 38 as illustrated in FIG. 2 for providing flow communication therethrough.

The first radial slot 58 illustrated in FIG. 3 is disposed between the prow and stern on the suction side of the vane. A second radial slot 64 is disposed in the prow 44 itself on the opposite pressure side of the vane forward of the septum 48. In this way, the prow and stern may be specifically configured for introducing the two radial slots 58,64 on opposite sides thereof immediately downstream of the leading edge.

A row of prow apertures 66 is disposed through the pressure sidewall thereof in flow communication with the prow channel 60 on one side and the second radial slot 64 on the opposite side, which slot is fed by the prow channel 60.

Correspondingly, a row of stern apertures 68 is disposed in the front wall of the stern adjacent to the imperforate septum 48 for providing flow communication between the stern channel 62 and the first radial slot 58, which slot feeds the stern channel. In this way, the two slots 58,64 cooperate with the respective internal channels in the stern and prow in flow communication through the outer band 38 illustrated in FIG. 2.

As shown in FIGS. 1 and 2, suitable means 70 are provided for supplying pressurized air 22 into the row of hollow vanes 36 for discharge through the prow apertures 66 into the corresponding prow slots 64. For example, the pressurized air may be bled from the compressor 14 or fan 12 by suitable conduits having flow control valves therein to distribute the pressurized air through an annular manifold surrounding the outer band 38 into each of the vanes 36 suitably joined thereto.

In this way, a common supply manifold is joined in flow communication to each of the prow channels 60 through the outer band for providing pressurized air into the prow. The pressurized air may then be discharged through the second slots 64, on the pressure side of the vanes for example, to promote and maintain attachment of the exhaust flow over the vane.

Correspondingly, FIGS. 1 and 2 illustrate additional means 72 for withdrawing the exhaust flow 24 from the exemplary first slots 58 disposed on the suction side of the vanes as illustrated in FIG. 3. As the exhaust flows over the vane suction sides during operation, a portion thereof is extracted or withdrawn through the stern apertures 68 and into the stern channel 62 for discharge through the outer band.

As shown in FIGS. 1 and 2, the withdrawing means 72 may include another annular manifold surrounding the outer band and disposed in flow communication with the corresponding stern channels 62 in each of the vanes for extracting exhaust flow therefrom. The withdrawing manifold may be simply vented to the atmosphere externally of the engine. During aircraft flight, the pressure outside the engine is substantially lower than the pressure inside the engine of the exhaust flow between the outlet guide vanes, and the atmosphere provides a suitable sink for withdrawing exhaust flow from the vanes.

The exemplary first slots 58 therefore draw the exhaust flow over the suction side of the prow for maintaining flow attachment thereto and preventing undesirable flow separation of the exhaust as it flows downstream over the suction side of the stern during operation.

FIG. 3 illustrates one embodiment of the bifurcated vanes 36 with specifically configured prow 44 and stern 46. The introduction of the suction side radial slot 58 interrupts the axial continuity of the vane suction side, and correspondingly introduces a locally small convex suction side on the prow itself leading into the slot 58. The convex profile of the prow itself may be used for enhancing flow attachment of the exhaust flow thereover as well as over the remaining suction side of the vane over the stern.

In this way, the bifurcated vane may be designed to handle the large range of swirl angles found in the STOVL aircraft engine without requiring articulation or repositioning of the vane itself, and the associated complexity thereof. The stern channel 62 may be simply vented outside the engine so that a portion of the exhaust flow over the vane suction side is withdrawn through the first slot 58 for enhancing flow attachment notwithstanding large variation in the swirl angle.

Correspondingly, the second slot 64 receives pressurized air from the prow channel 60 and discharges that air in a thin film aft along the pressure side of the vane for enhancing flow attachment of the exhaust flow thereover.

Figure 4:
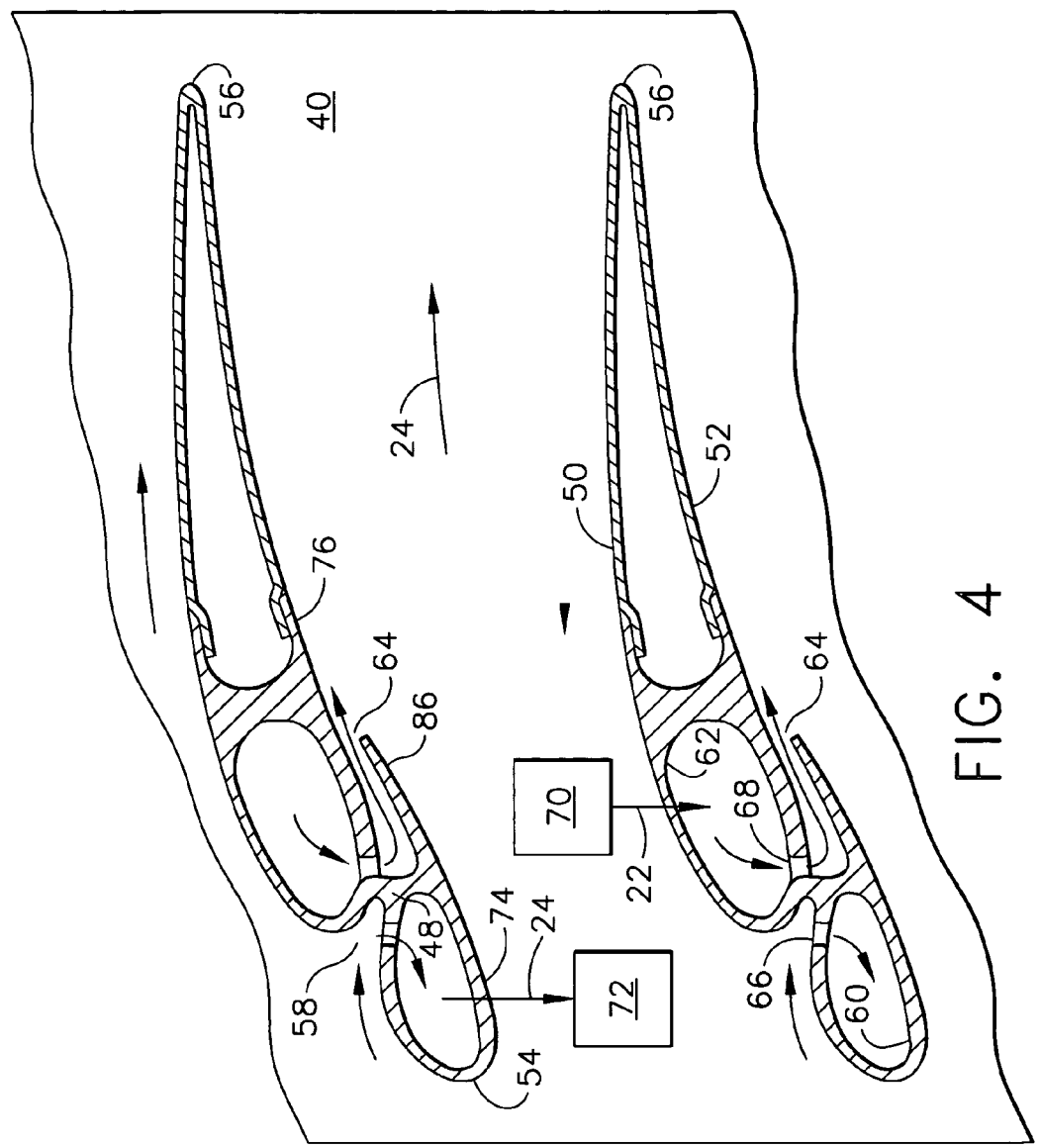
FIG. 4 is a planiform sectional view, like FIG. 3, of the OGVs in accordance with another embodiment.
Figure 5:
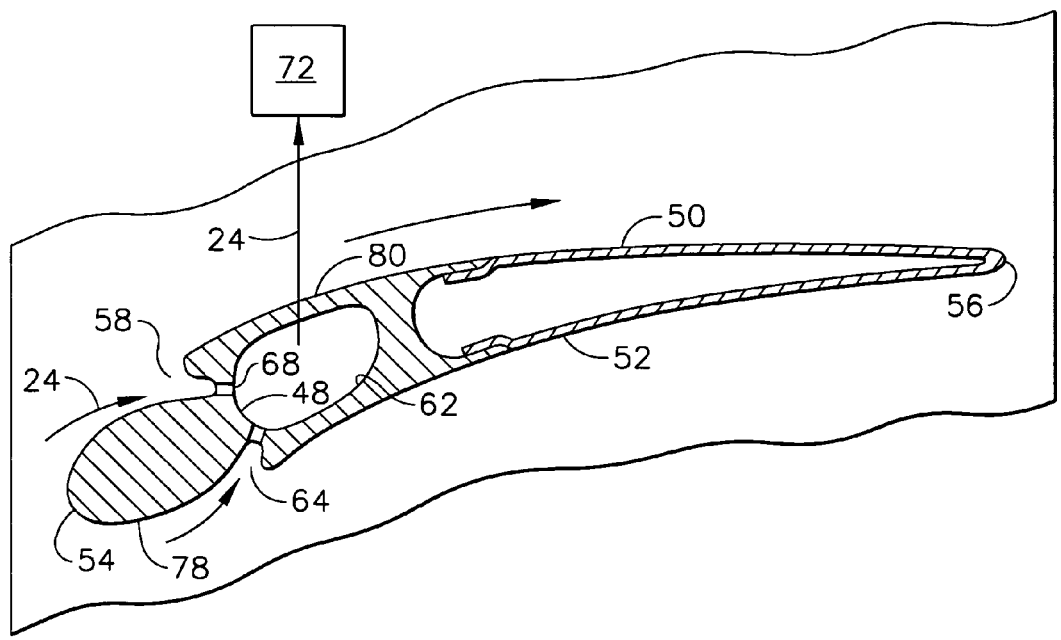
FIG. 5 is a planiform sectional view, like FIG. 3, of the OGVs in accordance with another embodiment.
Figure 6:
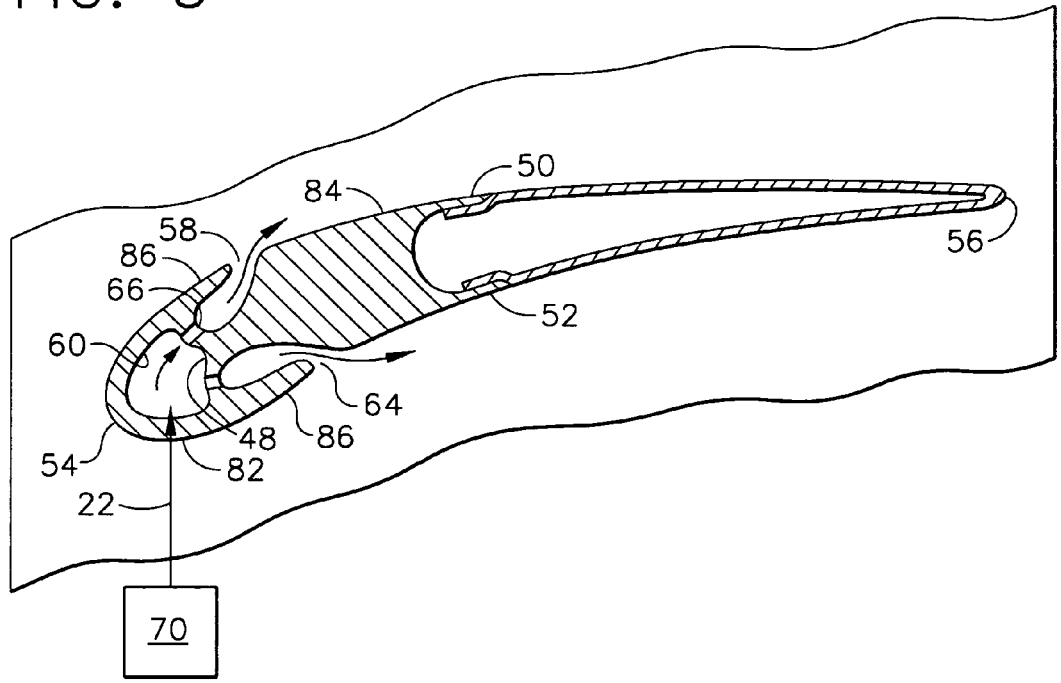
FIG. 6 is a planiform sectional view, like FIG. 3, of the OGVs in accordance with another embodiment.

The different configurations of the prow 44 and stern 46 and the associated slots 58,64 permit various permutations thereof which may be used to advantage in increasing the range of swirl angle while reducing or avoiding undesirable flow separation over the vanes during operation. FIG. 3 illustrates one embodiment, and FIGS. 4, 5, and 6 illustrate alternate embodiments in which common features are identified by common reference numerals, and suitably modified for the different embodiments. Since the prows and sterns have modified configurations in FIGS. 4–6, they themselves are differently numbered, notwithstanding the otherwise similar features and operation thereof.

For example, the first, or suction-side, slot 58 illustrated in FIG. 3 faces forward toward the leading edge in the vane suction side 50 for collecting a portion of the exhaust flow therein for discharge through the outer band. In FIG. 4, the modified prow 74 is similarly configured for introducing the forward facing first slot 58 and is integral with the corresponding stern 76. And, in FIG. 5 the modified prow 78 is also similarly configured for introducing the forward facing first slot 58 and is integral with the corresponding stern 80.

In the alternate embodiments illustrated in FIGS. 3, 4, and 5, the prows and sterns therein are spaced chordally apart at the corresponding first slots 58 in the suction sides to provide unobstructed open access to those slots for freely receiving the exhaust flow. Correspondingly, the suction side portions of those differently configured prows 44,74,78 have locally convex profiles for maintaining flow attachment of the incoming exhaust flow irrespective of the large range in swirl angles.

FIG. 6 illustrates that the first slot 58 in the suction side of the vane may alternatively face aft toward the trailing edge, with the corresponding prow 82 including a lip 86 extending aft over most of the first slot 58 and is integral with the corresponding stern 84.

FIG. 5 illustrates that the second slot 64 in the vane pressure side 52 may alternatively face forward toward the leading edge 54 for collecting the exhaust if desired. And, the prow 78 and stern 80 are spaced chordally apart at the forward facing slot 64 to provide unobstructed open access thereto.

FIGS. 4 and 6 illustrate additional modifications in which the second slot 64 faces aft toward the trailing edge in the vane pressure side 52. And, additional lips 86 extend aft over the corresponding second slots 64 to provide smooth transitions between the corresponding prows and sterns.

FIGS. 4–6 illustrate exemplary embodiments in which the corresponding septums 48 thereof are spaced inwardly from both sides of the vanes to introduce opposite radial slots 58,64 therein.

In the FIG. 5 embodiment, the two slots 58,64 are similarly configured in the corresponding suction and pressure sides 50,52 of the vane, and both face forward toward the leading edge without flow obstruction. In this embodiment, the prow 78 is solid without any internal flow channel, and the stern 80 alone includes the stern channel 62 and two rows of the stern apertures 68 corresponding with the two radial slots 58,64 in the opposite sides of the vane. In this way, corresponding portions of the exhaust flow 24 may be withdrawn from both sides of the vane just aft of the leading edge for promoting flow attachment on both sides of the vane notwithstanding the large swing in swirl angle.

FIG. 6 illustrates yet another embodiment in which the two slots 58,64 in the opposite suction and pressure sides 50,52 of the vane both face aft toward the trailing edge, with each slot including a corresponding lip 86 for maintaining an aerodynamically smooth junction between the prow 82 and stern 84.

In this embodiment, the stern 84 immediately aft of the septum 48 may be solid without the internal stern channel therein, and the prow 82 includes a common prow channel 60 for feeding both radial slots 58,64 through corresponding rows of the prow apertures 66. The prow 82 including the aft lips 86 thereof may be specifically configured in profile for enhancing flow attachment of the exhaust flow during operation, with flow attachment being further enhanced by the discharge of pressurized air from the two slots 58,64 during operation.

FIG. 4 illustrates yet another embodiment in which the two slots 58,64 are disposed on opposite sides of the common septum 48. The first slot 58 of the vane suction side 50 faces forward toward the leading edge without obstruction, and the second slot 64 in the vane pressure side 52 faces aft toward the trailing edge, and covered in most part by the lip 86. The lip 86 in this embodiment overlaps the pressure side of the stern 76, and is not aligned flush therewith in the manner illustrated in the FIG. 6 embodiment.

In the FIG. 3 embodiment, the septum 48 is spaced inwardly from only the vane suction side 50 and adjoins the vane pressure side 52. And, the first radial slot 58 in the vane suction side faces forward, whereas the second slot 64 in the prow pressure side 52 faces aft toward the trailing edge.

In the FIG. 3 embodiment, the prow 44 itself includes the second slot 64 facing aft in the pressure side of the vane upstream from the septum 48. And, in the alternate embodiments illustrated in FIGS. 4 and 6, the aft-facing second slot 64 is located at the septum 48 itself under the aft lip extension 86 of the prow.

But for the two rows of prow and stern apertures 66,68 which provide flow communication between the respective slots 58,64 and prow and stern channels 60,62, the various embodiments of prows and sterns are otherwise imperforate for maintaining aerodynamically smooth contours of the bifurcated vanes.

In the several embodiments illustrated in FIGS. 3–6, the prows and sterns may be formed together in a common casting in view of the complex configuration thereof. The internal channels, apertures, and slots may also be conveniently formed by conventional casting.

The aft portions of the various sterns illustrated in FIGS. 3–6 are preferably manufactured as separately fabricated sheet metal components and suitably joined to the corresponding castings by brazing for example. Alternatively, the entire bifurcated vane may be cast in one unitary component, or could alternatively be a fabrication of sheet metal parts integrally joined together in a one-piece component or assembly.

The various embodiments of the bifurcated outlet guide vanes illustrated in the several figures introduce corresponding prows and sterns separated by radial slots in the corresponding sides of the vanes. The prow may be separately configured for maximizing aerodynamic performance thereof based on the particular incident angle of exhaust flow, with the corresponding sterns being separately configured for maintaining flow attachment of the exhaust flow during the deswirling process.

The slots in the pressure and suction sides of the vanes may be configured for discharging pressurized air along the corresponding vane side or withdrawing a portion of the exhaust flow for maintaining flow attachment without undesirable flow separation during operation. Pressurized air may be introduced on one or both sides of each vane; or the exhaust flow may be withdrawn from one or both sides of each vane; or air may be supplied on one side while exhaust flow is withdrawn on the other side of each vane as desired for maximizing performance.

The corresponding means for supplying pressurized air or withdrawing exhaust flow from the outlet guide vanes may be suitably coordinated using flow control valves under computer control for best coordinating operation of the vanes with operation of the engine from the normal mode of operation to the STOVL mode of operation during which the swirl angle of the exhaust flow discharged from the core engine swings over a substantially large range, such as the 60 degrees range disclosed above, or even higher.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

The invention claimed is:

1. A turbine rear frame comprising:
    a row of outlet guide vanes extending radially between outer and inner bands in said turbine rear frame, and each vane including an internal channel extending through said outer band;
    each of said vanes being bifurcated into a forward prow integrally joined to an aft stern by a narrow septum introducing a first radial slot between said prow and stern; and
    a row of apertures disposed adjacent said septum in each of said vanes in flow communication between said channels and first slots.

2. A frame according to claim 1 wherein said prow and stern in each of said vanes collectively define a unitary assembly including an aerodynamic profile having a convex suction side and an opposite concave pressure side extending chordally from a leading edge on said prow, and converging to a trailing edge on said stern, and interrupted chordally therebetween by said first slot.

3. A frame according to claim 2 further comprising means for supplying pressurized air into said hollow vanes for discharge through said apertures into said first slots.

4. A frame according to claim 2 further comprising means for withdrawing exhaust flow from said first slots and through said apertures and hollow vanes.

5. A frame according to claim 2 further comprising:
an internal channel in said prow disposed in flow communication with a second slot by a row of prow apertures;
an internal channel in said stern disposed in flow communication with said first slot by a row of stern apertures;
means for supplying pressurized air into said vanes for discharge through said first or second slots; and
means for withdrawing exhaust flow through said vanes from said first and second slots in contraposition with said air supplying means.

6. A frame according to claim 2 wherein said radial slot faces forward in said vane suction side.

7. A frame according to claim 2 wherein said radial slot faces aft in said vane suction side.

8. A frame according to claim 2 wherein said radial slot faces forward in said vane pressure side.

9. A frame according to claim 2 wherein said radial slot faces aft in said vane pressure side.

10. A frame according to claim 2 wherein each of said vanes includes said first radial slot in one side thereof, and a second radial slot on an opposite side thereof joined in flow communication with a second internal channel therein.

11. A turbine rear frame comprising:
a row of outlet guide vanes extending radially between outer and inner bands in said turbine rear frame; and
each of said vanes includes a prow integrally joined to a stern by a septum extending chordally therebetween to collectively define an aerodynamic profile having a convex suction side and a concave pressure side extending chordally between a leading edge on said prow and a trailing edge on said stern interrupted chordally therebetween at said septum.

12. A frame according to claim 11 wherein said septum is narrow and introduces a radial slot separating in part said prow from said stern.

13. A frame according to claim 12 wherein said prow is a minor portion of each of said vanes, and said stern is a major portion thereof.

14. A frame according to claim 13 wherein said stern converges aft to said trailing edge from its junction with said prow at said septum.

15. A frame according to claim 14 wherein said vanes are hollow in part and include a row of apertures adjacent said septum in flow communication with said slot, and said prow, stern, and septum comprise a unitary assembly.

16. A frame according to claim 15 wherein said hollow vanes are metal and include internal channels extending through said outer band in flow communication with said apertures.

17. A frame according to claim 16 further comprising means for supplying pressurized air into said hollow vanes for discharge through said apertures into said slots.

18. A frame according to claim 16 further comprising means for withdrawing exhaust flow from said slots and through said apertures and hollow vanes, and said vanes are disposed immediately downstream of the last stage of turbine rotor blades in a low pressure turbine.

19. A frame according to claim 16 wherein said slot faces forward in said vane suction side.

20. A frame according to claim 19 wherein said prow and stern are spaced apart at said slot to provide unobstructed access to said slot.

21. A frame according to claim 16 wherein said slot faces aft in said vane suction side.

22. A frame according to claim 21 wherein said prow includes a lip extending aft over said slot.

23. A frame according to claim 16 wherein said slot faces forward in said vane pressure side.

24. A frame according to claim 23 wherein said prow and stern are spaced apart at said slot to provide unobstructed access to said slot.

25. A frame according to claim 16 wherein said slot faces aft in said vane pressure side.

26. A frame according to claim 25 wherein said prow includes a lip extending aft over said slot.

27. A frame according to claim 16 wherein said septum is spaced inwardly from both sides of said vane to introduce opposite radial slots therein.

28. A frame according to claim 27 wherein said slots in said suction and pressure sides both face forward.

29. A frame according to claim 27 wherein said slots in said suction and pressure sides both face aft.

30. A frame according to claim 27 wherein said slot in said vane suction side faces forward, and said slot in said vane pressure side faces aft.

31. A frame according to claim 16 wherein said septum is spaced inwardly from said vane suction side and adjoins said vane pressure side, and said slot faces forward in said vane suction side.

32. A frame according to claim 31 wherein:
said prow includes a second radial slot facing aft in said vane pressure side; and
said prow is hollow, and includes another row of apertures extending therethrough in flow communication with said second slot.

* * * * *